United States Patent [19]

Gazzarrini et al.

[11] 4,224,040
[45] Sep. 23, 1980

[54] PROCESS FOR THE PURIFICATION OF CHLOROSILANES

[75] Inventors: Franco Gazzarrini, Novara; Moreno Morici; Vittorio Trapani, both of Merano, all of Italy

[73] Assignee: Smiel S.p.A., Milan, Italy

[21] Appl. No.: 966,507

[22] Filed: Dec. 4, 1978

[30] Foreign Application Priority Data

Dec. 5, 1977 [IT] Italy .............................. 30371 A/77

[51] Int. Cl.² ............................................. B01D 53/02
[52] U.S. Cl. .......................................... 55/71; 55/72; 55/74; 55/73
[58] Field of Search .......................... 55/71, 74, 72, 73; 252/441, 442; 423/342, DIG. 14; 260/448.2 H

[56] References Cited

FOREIGN PATENT DOCUMENTS

| 649511 | 10/1962 | Canada ..................................... 423/342 |
| 51-16282 | 2/1976 | Japan ........................................... 55/74 |
| 536835 | 12/1976 | U.S.S.R. ...................................... 55/74 |

Primary Examiner—Charles N. Hart
Assistant Examiner—E. Rollins Cross
Attorney, Agent, or Firm—Stevens, Davis, Miller & Mosher

[57] ABSTRACT

A process for purifying clorosilanes from B, As, Al, P, Sb and organic impurities, comprising the following steps:
(a) adsorbing at room temperature the P, As and Sb impurities by means of $AlF_3$ and/or anhydrous $MgCl_2$ having high specific surface and/or slight acid cationic resins, up to a maximum of 1 mg of P, As and Sb impurities per gram of $AlF_3$ and cationic resins and up to a maximum of 800 mg of the same impurities per gram of anhydrous $MgCl_2$;
(b) adsorbing at room temperature the B and Al impurities by means of basic compounds according to Lewis containing nitrogen, up to a maximum of 2 mg of impurities per gram of said basic compounds;
(c) adsorbing at room temperature the organic impurities by means of active coal up to a maximum of 15 mg of impurities per gram of active coal.

7 Claims, No Drawings

PROCESS FOR THE PURIFICATION OF CHLOROSILANES

FIELD OF THE INVENTION

This invention relates to a process for the purification of the chlorosilanes to the high level of purity required for the preparation of electronic grade silicon.

More particularly this invention relates to a process for the purification of trichlorosilane and silicon tetrachloride from phosphorus, arsenic, antimony, boron, aluminum and organic impurities.

DESCRIPTION OF THE PRIOR ART

It is known that trichlorosilane and silicon tetrachloride are cracked at high temperatures giving place to the formation of a silicon, which for the use in the electronic industry must have a purity of 6 nine (i.e. 99,9999%) and in particular a total boron, phosphorus, aluminum, antimony and carbon content lower than some parts per billion (p.p.b.).

According to the Prior Art, the purification of chlorosilanes—and in particular of trichlorosilane and $SiCl_4$ - is in general carried out by fractional distillation after the complexing or hydrolysation of the boron compounds by using hydrated oxides. A method for the purification from phosphorus impurities is based on the use of iodine before the fractional distillation.

German Pat. No. 1,289,834 suggests a purification method for chlorosilanes based on the absorption of B, As, P, Sb impurities on acid and basic aluminae.

SUMMARY OF THE INVENTION

We have now found, and this forms the object of this invention, a process for purifying chlorosilanes from B, As, Al, P, Sb and organic impurities, said process comprising the following steps:
 (a) adsorbing at room temperature the P, As and Sb impurities by means of $AlF_3$ and/or by means of $MgCl_2$ having high specific surface and or slight acid cationic resins, up to a maximum of 1 mg of P, As and Sb impurities per gram of $AlF_3$ or of cationic resins and up to a maximum of 800 mg of the same impurities per gram of anhydrous $MgCl_2$;
 (b) adsorbing at room temperature the B and Al impurities by means of basic compounds according to Lewis containing nitrogen, up to a maximum of 2 mg of impurities per gram of said basic compounds;
 (c) adsorbing at room temperature the organic impurities by means of active coal, up to a maximum of 15 mg of impurities per gram of active coal.

DESCRIPTION OF THE PREFERRED EMPBODIMENTS

For basic compounds according to Lewis containing nitrogen, there must be intended polymerization products and copolymerization products containing amine groups, pyridine, phenantrolinic groups, etc. and compounds with high specific surface such as molecular sieves, vinyl resins, etc. on which there have previously been adsorbed quinoline, pyridine, phenantroline etc. derivatives.

Amongst the products containing an amine group there are preferred anionic resins with one or more amine groups, good results being obtained, for instance, with polyvinylpyridine. Adsorbent $AlF_3$ is known product; good results are obtained from high purity $AlF_3$ with a particle size comprised between 100 and 200 microns.

Magnesium chloride that has given good results is a perfectly anhydrous magnesium chloride with a high specific surface, preferably greater than 100 sq.mt/g.

Slight acid cationic resins giving good results, are the commercial ones.

The purification process may be carried out according to traditional methods; we, however, prefer to let the substance to be purified flow through various columns containing the single adsorbent or through one single column containing layers of each adsorbent, the steps (a), (b) and (c) may be carried out in any order; in general it is preferable to carry out the step (c) after the steps (a) and (b).

The main advantages of this invention proved to be the following:
 the impurities are removed and not concentrated in the tail of the distillation products as happens, for instance, when there are used traditional purification systems;
 there are avoided hydrolysis processes with the consequential formation of HCl which may cause corrosion phonemena in the plant and consequently cause pollution of the product;
 the process in particularly simple inasmuch as it requires only small-sized columns;
 heating or coolings are not required inasmuch as the process operates at room temperature.

EXAMPLE 1

10 Kg of trichlorosilane (TCS), containing 50 p.p.m. of B were passed through a glass column filled with 100 g of a 10% polyvinylpyridine copolymer. At the outlet of the column the product, at the colorimetric analysis, showed a content in B below 0.5 ppm; the adsorbent proved to contain at the spectrographic analysis between 0.6 and 2% ppm of B.

EXAMPLE 2

50 Kg of TCS with a content in B corresponding to a resistivity of 40 Ohm/cm P measured on the silicon obtained by reduction with hydrogen according to the known industrial procedure, were passed through the column of Example 1 and then reduced with hydrogen in an industrial reactor. The silicon thus obtained showed a B content corresponding to a resistivity of 2000 Ohm/cm P.

EXAMPLE 3

50 Kg of silicon tetrachloride containing 6 ppm of B, were passed through the column of preceding Example 2. The eluted product, under colorimetric analysis, showed a B content below 0.5 ppm.

EXAMPLE 4

1 lt of TCS containing 230 mg of P, traced with P*32, was passed through a glass column of 10 mm diameter and containing 10 g of $MgCl_2$ with a specific surface of 500 s.mt/g.

The P content determined by counting the activity of the P*32, proved inferior to 0.1 mg/lt.

EXAMPLE 5

1 lt of TCS containing 230 mg/lt of P, 10 mg/lt of As and 100 mg/lt of Sb, was passed through the column of Example 4. The eluted product at the colorimetric analysis showed a P content below 0.1 mg/lt, an As content below 1 mg/lt and a Sb content equal to 1 mg/lt.

EXAMPLE 6

1 lt of $SiCl_4$, containing 200 mg/lt of P traced with $P^{*32}$, was passed through the column of Example 1.

The treated product showed a P content below 0.1 mg/lt.

EXAMPLE 7

10 lt of TCS containing 250 mg/lt of trimethylsilane were passed through a column containing 200 g of vegetable coal, activated and purified by treatments with acids. The eluted product showed a content in methylsilanes below 5 p.p.m., which was the detectable limit at the infrared analysis.

What is claimed is:

1. A process for purifying chlorosilanes from B, As, Al, P, Sb and organic impurities, comprising the following steps:
   (a) adsorbing at room temperature the P, As and Sb impurities by means of $AlF_3$ and/or anhydrous $MgCl_2$ having high specific surface and/or on slight acid cationic resins, up to a maximum of 1 mg of P, As and Sb impurities per gram of $AlF_3$ and cationic resins and up to a maximum of 800 mg of the same impurities per gram of anhydrous $MgCl_2$;
   (b) adsorbing at room temperature the B and Al impurities by means of basic compounds according to Lewis containing nitrogen, up to a maximum of 2 mg of impurities per gram of said basic compounds;
   (c) adsorbing at room temperature the organic impurities by means of active coal up to a maximum of 15 mg of impurities per gram of active coal.

2. A process according to claim 1, characterized in that the basic compound according to Lewis is an anionic resin containing an amine group or a vinyl resin on which pyridine was made to be absorbed.

3. A process according to claim 1, characterized in that the adsorbents are contained in separate columns through which the chlorosilanes to be purified are let to flow.

4. A process according to claim 1, characterized in that the adsorbents in several layers are contained in one single column through which the chlorosilanes to be purified are let to flow.

5. A process according to claim 1, characterized in that the adsorbents are directly admixed to the chlorosilanes to be purified.

6. A process according to claim 1, characterized in that the chlorosilane to be purified is trichlorosilane.

7. A process according to claim 1, characterized in that the chlorosilane to be purified is silicon tetrachloride.

* * * * *